US012116256B2

(12) United States Patent
Tamanna et al.

(10) Patent No.: US 12,116,256 B2
(45) Date of Patent: Oct. 15, 2024

(54) SYRINGE CARTRIDGE ASSEMBLY FOR A BEVERAGE DISPENSING SYSTEM

(71) Applicant: The Coca-Cola Company, Atlanta, GA (US)

(72) Inventors: Sanjida Tamanna, Marietta, GA (US); Dick P. Welch, Marietta, GA (US); Zachary Ian Stelwagon, Chappaqua, NY (US)

(73) Assignee: THE COCA-COLA COMPANY, Atlanta, GA (US)

( * ) Notice: Subject to any disclaimer, the term of this patent is extended or adjusted under 35 U.S.C. 154(b) by 0 days.

(21) Appl. No.: 18/492,994

(22) Filed: Oct. 24, 2023

(65) Prior Publication Data

US 2024/0051812 A1 Feb. 15, 2024

Related U.S. Application Data

(63) Continuation of application No. 17/756,923, filed as application No. PCT/US2021/014547 on Jan. 22, 2021, now Pat. No. 11,827,505.

(60) Provisional application No. 62/975,830, filed on Feb. 13, 2020.

(51) Int. Cl.
*B67D 1/00* (2006.01)
*B67D 1/12* (2006.01)

(52) U.S. Cl.
CPC ......... *B67D 1/0031* (2013.01); *B67D 1/1231* (2013.01); *B67D 1/0037* (2013.01)

(58) Field of Classification Search
CPC .. B67D 1/0031; B67D 1/1231; B67D 1/0037; B67D 1/0079; B67D 1/103; B67D 1/104; B67D 1/0039
See application file for complete search history.

(56) References Cited

U.S. PATENT DOCUMENTS 2,736,466 A 2/1956 Rodth
3,591,051 A * 7/1971 Mitchell .............. B67D 1/1288 222/145.6
3,830,405 A * 8/1974 Jaeger .................... B67D 1/103 222/386
4,779,761 A 10/1988 Rudick et al.
(Continued)

FOREIGN PATENT DOCUMENTS

EP 0 335 598 A1 10/1989
EP 1 517 037 A2 3/2005
(Continued)

OTHER PUBLICATIONS

International Search Report and Written Opinion for PCT/US2021/014547, dated May 12, 2021 (7 pp.).
(Continued)

*Primary Examiner* — Donnell A Long
(74) *Attorney, Agent, or Firm* — Eversheds Sutherland (US) LLP

(57) ABSTRACT

The present application provides a beverage dispensing system. The beverage dispensing system may include a syringe cartridge assembly and a nozzle. The syringe cartridge assembly may include an ingredient chamber, a water chamber, and a dosing pump such that the ingredient chamber is in communication with the nozzle and the water chamber is in communication with the dosing pump.

15 Claims, 1 Drawing Sheet

(56) References Cited

U.S. PATENT DOCUMENTS

| | | | | | |
|---|---|---|---|---|---|
| 4,966,306 | A * | 10/1990 | Credle, Jr. | B67D 1/0048 | 417/245 |
| 5,121,855 | A | 6/1992 | Credle, Jr. | | |
| 5,172,831 | A * | 12/1992 | Burrows | B67D 1/0079 | 222/481.5 |
| 5,381,926 | A * | 1/1995 | Credle, Jr. | B67D 1/0032 | 222/1 |
| 5,738,248 | A * | 4/1998 | Green | B67D 1/0046 | 222/145.6 |
| 6,149,032 | A * | 11/2000 | Seitz | G01F 3/16 | 222/25 |
| 6,193,109 | B1 * | 2/2001 | Credle, Jr. | B67D 1/101 | 222/145.5 |
| 8,087,303 | B2 * | 1/2012 | Beavis | G01F 3/10 | 73/861.47 |
| 2002/0023935 | A1 | 3/2002 | Heyes | | |
| 2008/0029541 | A1 | 2/2008 | Wallace et al. | | |

FOREIGN PATENT DOCUMENTS

| | | | |
|---|---|---|---|
| JP | 2002-114296 | A | 4/2022 |
| KR | 10-2073945 | B1 | 12/2000 |
| KR | 10-2017-0023437 | A | 3/2017 |
| WO | 2018/112053 | A2 | 6/2018 |

OTHER PUBLICATIONS

Extended European Search Report for EP 21753807.3, dated Feb. 12, 2024 (8 pp.).

* cited by examiner

SYRINGE CARTRIDGE ASSEMBLY FOR A BEVERAGE DISPENSING SYSTEM

TECHNICAL FIELD

The present application and the resultant patent relate generally to beverage dispensing systems and more particularly relate to beverage dispensing systems having one or more syringe cartridge assemblies to accommodate limited time beverage offerings and/or smaller volume beverage brands and/or flavors.

BACKGROUND OF THE INVENTION

Generally described, current post-mix beverage dispensers usually mix streams of syrup, concentrate, sweetener, bonus flavors, other types of flavoring, and/or other types of ingredients with water and/or other types of diluent. The ingredients may be stored in bag-in-box containers and the like at a distance from the beverage dispenser. The ingredients may be pumped to the beverage dispenser and mixed with the diluent in or downstream of the nozzle.

Recent improvements in beverage dispensing technology have focused on the use of micro-ingredients. With micro-ingredients, the traditional beverage bases are separated into their constituent parts at much higher dilution or reconstitution ratios. Generally described, beverage dispenser may create a beverage by combining a number of highly concentrated micro-ingredients with a macro-ingredient such as a sweetener and a diluent such as still or carbonated water. The micro-ingredients generally are stored in cartridges positioned within or adjacent to the beverage dispenser itself. The number and type of beverages offered by the beverage dispenser thus may be limited only by the number and type of micro-ingredient cartridges positioned therein.

Any surface of the beverage dispenser that touches the syrups, concentrates, or other ingredients must be thoroughly cleaned when changing over from one beverage brand or flavor to another. Specifically, the lines, the pumps, the valves, and the other components therein must be cleaned. Lingering flavor absorption in the materials of the beverage dispenser components also may be a concern. A service call or other types of downtime and expense thus may be required to replace a beverage brand or flavor.

As a result, the operator of the beverage dispenser may be reluctant to provide limited time offerings of different beverage brands or flavors. These limited time offerings may be regional, seasonal, promotional, and the like. For example, certain types of "pumpkin spice" beverages may be popular in the fall while cinnamon or mint flavored beverages may be popular during the winter. The reluctance of the operator to replace existing brands or flavors thus may result in the failure to capture many types of limited time offering opportunities and promotional ties-ins. Moreover, the operator also may be reluctant to try new beverages or flavors without an established or predictable volume expectation.

There is thus a desire for an improved beverage dispensing system with one or more limited time offering circuits. Such an improved beverage dispensing system may provide new and different beverage brands and flavors without the need for a service call or extensive downtime and without reducing the number or volume of the existing beverage brands or flavors.

SUMMARY OF THE INVENTION

The present application and the resultant patent thus provide a beverage dispensing system. The beverage dispensing system may include a syringe cartridge assembly and a nozzle. The syringe cartridge assembly may include an ingredient chamber, a water chamber, and a dosing pump such that the ingredient chamber is in communication with the nozzle and the water chamber is in communication with the dosing pump.

The present application and the resultant patent further may provide a method of dosing an ingredient to a nozzle of a beverage dispensing system. The method may include the steps of adding a volume of the ingredient to an ingredient chamber of a syringe cartridge assembly, positioning the syringe cartridge assembly about the nozzle, attaching a dosing conduit to a water chamber of the syringe cartridge assembly, dosing a volume of water to the water chamber, and forcing a volume of the ingredient out of the ingredient chamber and into the nozzle.

The present application and the resultant patent further may provide a syringe cartridge assembly for dosing an ingredient to a nozzle of beverage dispensing system. The syringe cartridge assembly may include a cartridge body, with an ingredient chamber and a water chamber, and a dosing pump. The ingredient chamber of the cartridge body may be in communication with the nozzle and the water chamber of the cartridge body may be in communication with the dosing pump.

These and other features and improvements of the present application and the resultant patent will become apparent to one of ordinary skill in the art upon review of the following detailed description when taken in conjunction with the several drawings and the appended claims.

BRIEF DESCRIPTION OF THE DRAWINGS

FIG. 2 is a schematic diagram of a syringe cartridge assembly as may be described herein that may be used with the beverage dispensing system of FIG. 1 and the like.

DETAILED DESCRIPTION

Figure 1:
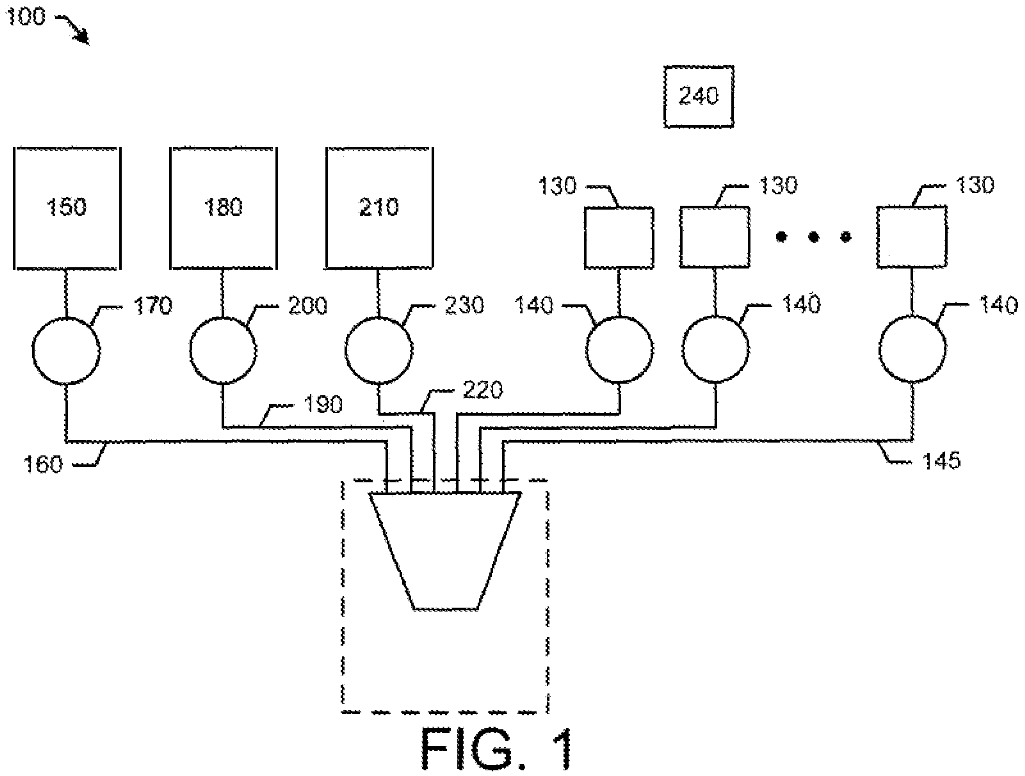
FIG. 1 is a schematic diagram of an exemplary beverage dispensing system.

Referring now to the drawings, in which like numerals refer to like elements throughout the several views, FIG. 1 shows an example of a beverage dispensing system 100 as may be described herein. The beverage dispensing system 100 may be used for dispensing many different types of beverages or other types of fluids. Specifically, the beverage dispensing system 100 may be used with diluents, macro-ingredients, micro-ingredients, and other types of fluids. The diluents generally include plain water (still water or non-carbonated water), carbonated water, and other fluids. Any type of fluid may be used herein.

Generally described, the macro-ingredients may have reconstitution ratios in the range from full strength (no dilution) to about six (6) to one (1) (but generally less than about ten (10) to one (1)). The macro-ingredients may include sugar syrup, HFCS ("High Fructose Corn Syrup"), concentrated extracts, purees, and similar types of ingredients. Other ingredients may include dairy products, soy, and rice concentrates. Similarly, a macro-ingredient base product may include the sweetener as well as flavorings, acids, and other common components as a beverage syrup. The beverage syrup with sugar, HFCS, or other macro-ingredient base products generally may be stored in a conventional bag-in-box container remote from the beverage dispenser. The viscosity of the macro-ingredients may range from about 1 to about 10,000 centipoise and generally over 100 centipoises when chilled. Other types of macro-ingredients and the like may be used herein.

The micro-ingredients may have reconstitution ratios ranging from about ten (10) to one (1) and higher. Specifically, many micro-ingredients may have reconstitution ratios in the range of about 20:1, to 50:1, to 100:1, to 300:1, or higher. The viscosities of the micro-ingredients typically range from about one (1) to about six (6) centipoise or so, but may vary from this range. Examples of micro-ingredients include natural or artificial flavors; flavor additives; natural or artificial colors; artificial sweeteners (high potency, nonnutritive, or otherwise); antifoam agents, nonnutritive ingredients, additives for controlling tartness, e.g., citric acid or potassium citrate; functional additives such as vitamins, minerals, herbal extracts, nutraceuticals; and over the counter (or otherwise) medicines such as turmeric, acetaminophen; and similar types of ingredients. Various types of alcohols may be used as either macro- or micro-ingredients. The micro-ingredients may be in liquid, gaseous, or powder form (and/or combinations thereof including soluble and suspended ingredients in a variety of media, including water, organic solvents, and oils). Other types of micro-ingredients may be used herein.

The various fluids used herein may be mixed in or about a dispensing nozzle 110. The dispensing nozzle 110 may be a conventional multi-flavor nozzle and the like. The dispensing nozzle 110 may have any suitable size, shape, or configuration. The dispensing nozzle 110 may be positioned within a dispensing tower 120. The dispensing tower 120 made have any suitable size, shape, or configuration. The dispensing tower 120 may extend from a countertop and the like and/or the dispensing tower 120 may be a free-standing structure. The dispensing tower 120 may have a number of the dispensing nozzles 110 thereon.

The micro-ingredients may be stored in a number of micro-ingredient containers 130 or other types of micro-ingredient sources. The micro-ingredient containers 130 may have any suitable size, shape, or configuration. Any number of the micro-ingredient containers 130 may be used herein. The micro-ingredient containers 130 may be in communication with the dispensing nozzle 110 via a number of micro-ingredient pumps 140 positioned on a number of micro-ingredient conduits 145. The micro-ingredient pumps 140 may be positive-displacement pumps so as to provide accurately very small doses of the micro-ingredients. Similar types of devices may be used herein such as peristaltic pumps, solenoid pumps, piezoelectric pumps, and the like. The micro-ingredient pumps 140 made have any suitable volume or capacity. The micro-ingredient containers 130 may be positioned in, adjacent to, and/or remote from the dispensing nozzle 110. For example, the micro-ingredient containers 130 may be positioned under the counter top upon which the dispensing tower 120 rests. Some or all of the micro-ingredient containers 130 may be agitated.

A still water source 150 may be in communication with the dispensing nozzle 110 via a still water conduit 160. Other types of diluents may be used herein. Still water or other types of diluents may be pumped to the dispensing nozzle 110 via a still water pump 170. The still water pump 170 may be may be any type of conventional fluid moving device and made have any suitable volume or capacity. Alternatively, the pressure in a conventional municipal water source may be sufficient without the use of a pump. Any number of still water sources 150 may be used herein.

A carbonated water source 180 may be in communication with the dispensing nozzle 110 via a carbonated water conduit 190. The carbonated water source 180 may be a conventional carbonator and the like. The carbonator may have any suitable size, shape, or configuration. Carbonated water or other types of diluents may be pumped to the dispensing nozzle 110 via a carbonated water pump 200. The carbonated water pump 200 may be any type of conventional fluid moving device and made have any suitable volume or capacity. Any number of carbonated water sources 180 may be used herein. A carbonated water recirculation line also may be used herein.

One or more macro-ingredient sources 210 may be in communication with the dispensing nozzle 110 via one or more macro-ingredient conduits 220. As described above, the macro-ingredient sources 210 may include sweeteners such as high fructose corn syrup, sugar solutions, and the like. The macro-ingredient sources 210 may be a conventional bag-in-box or other type of container in any suitable size, shape, or configuration. Any number of the macro-ingredient sources 210 may be used herein. The macro-ingredients may flow to the dispensing nozzle 110 via a macro-ingredient pump 230. In this case, the macro-ingredient pump 230 may be a controlled gear pump and the like. Other types of pumps may be used herein.

Operation of the beverage overall dispensing system 100 and the component therein may be controlled by a control device 240. The control device 240 may be a conventional microcomputer and the like capable of executing programmable commands. The control device 240 may be internal or external from the beverage dispensing system 100. The functionality of the control device 240 may be implemented in software, firmware, hardware, or any combination thereof. One control device 240 may control multiple beverage dispensing systems 100 and/or one beverage dispensing system 100 may have multiple control devices 240 with specific tasks.

Figure 2:
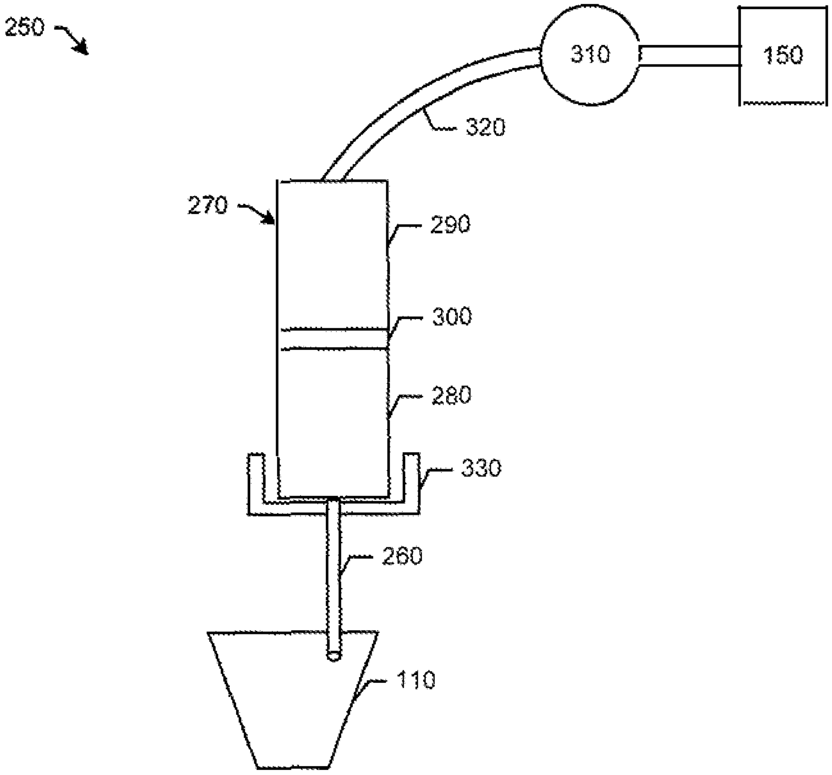

FIG. 2 shows a syringe cartridge assembly 250 that may be used with the beverage dispensing system 100. The syringe cartridge assembly 250 may be similar to a conventional medical syringe and the like. Specifically, the syringe cartridge assembly 250 may include a needle 260 and a cartridge body 270. The needle 260 may be of conventional design and may be made out of metal or other types of substantially rigid materials. The diameter of the needle 260 may vary depending upon the nature of the micro-ingredients or other fluids to be used therein. The needle 260 may be resistant to flavor absorption and may be easy to clean. The cartridge body 270 may be made out of thermoplastics or any type of food grade material. The cartridge body 270 may have any suitable size, shape, or volume.

The cartridge body 270 may have an ingredient chamber 280 and a water chamber 290. The ingredient chamber 280 may be filled with micro-ingredients, macro-ingredient, or other types of fluids. The water chamber 290 may be filled with water or other types of fluids. The ingredient chamber 280 and the water chamber 290 may be separated by a plunger 300. The plunger 300 may be movable within the cartridge body 270 under hydraulic pressure while maintaining a seal between the ingredient chamber 280 and the water chamber 290. The plunger 300 may be made out of an elastomeric material and the like. Other components and other configurations also may be used herein.

The syringe cartridge assembly 250 may be in communication with a dosing pump 310. The dosing pump 310 may be the same or similar to the micro-ingredient pumps 140 described above. For example, the dosing pump 310 may be a positive-displacement pump so as to provide accurately very small doses of water or other fluids under high pressure. In addition to those described above, any type of precise metering pumps such as a nutating pump, a plunger pump, and the like may be used herein. Similarly, different types of linear actuators and the like also may be used herein. The dosing pump 310 may be in communication with the water source 150 or other source of fluid. The dosing pump 310 may be in communication with the water chamber 290 of the cartridge body 270 via a dosing conduit 320. The dosing conduit 320 may have any suitable length. Other components and other configurations may be used herein.

The syringe cartridge assembly 250 may be positioned within the beverage dispensing system 100 adjacent to the nozzle 110. The syringe cartridge assembly 250 may be positioned within a locking interface 330. The needle 260 may be attached directly to the locking interface 330 and to the cartridge body 270. The locking interface 330 may be any type of support structure to hold the cartridge body 270 in place. Any number of the syringe cartridge assemblies 250 may be used herein.

In use, the ingredient chamber 280 of the cartridge body 270 may be filled with the desired micro-ingredient, macro-ingredient, or other fluid. The needle 260 may be attached to the cartridge body 270. The needle 260 and/or the cartridge body 270 may be secured within the locking interface 330. The dosing conduit 320 may be attached to the water chamber 290 of the cartridge body 270. The ingredient chamber 280 of the cartridge body 270 may be primed by the dosing pump 310 pumping a predetermined dose of water into the water chamber 290 such that the plunger 300 moves under hydraulic pressure. The plunger 300 thus compresses the ingredient chamber 280 to ensure that a dose of the micro-ingredient or other fluid is ready to be dispensed.

When a beverage containing the micro-ingredient or other fluid is to be dispensed from the beverage dispensing system 100, the control device 240 instructs the dosing pump 310 to pump a predetermined dose of water into the water chamber 290. This volume of water expands the water chamber 290 by moving the plunger 300 under hydraulic pressure to compress the ingredient chamber 280. Compressing the ingredient chamber 280 forces a dose of the micro-ingredient, macro-ingredient, or other fluid through the needle 260 and into the nozzle 110. The volume of the micro-ingredient, macro-ingredient, or other fluid that flows out of the ingredient chamber 280 equals the volume of water that flows into the water chamber 290. This process may be repeated until the ingredient chamber 280 is substantially empty. The volume of the dose of the micro-ingredient, macro-ingredient, or other fluid may vary depending upon the nature of the micro-ingredient, macro-ingredient, or other fluid, based upon the nature of the desired beverage, and/or based upon other parameters. Likewise, the pressure applied by the dosing pump 310 also may be varied. Other components and other configurations may be used herein.

When the ingredient chamber 280 is empty or if a new micro-ingredient, macro-ingredient, or other fluid is desired to be installed. The existing cartridge body 270 and/or the needle 260 may be removed from the locking interface 330. The needle 260 may be cleaned in a conventional fashion and/or the needle 260 may be disposable and replaced. A new cartridge body 270 may be attached to the needle 260 and/or to the locking interface 330 and the process may be repeated. The syringe cartridge assembly 250 thus provides easy and fast replacement of the desired micro-ingredient, macro-ingredient, or other fluid in that only the needle 260 requires cleaning. If the needle 260 is disposable, the entire syringe cartridge assembly 250 may be replace as a whole. The syringe cartridge assembly 250 also makes the replacement of components very easy and efficient.

The syringe cartridge assembly 250 thus provides the ability for the beverage dispensing system 100 to provide any number of limited time beverage offerings and/or smaller volumes of beverage brands or flavors without requiring extensive or time-consuming change over procedures. Likewise, the syringe cartridge assembly 250 may allow an operator to experiment with new beverage brands and flavors without reducing the existing number and volume of beverage brands and flavors available therein.

It should be apparent that the foregoing relates only to certain embodiments of the present application and the resultant patent. Numerous changes and modifications may be made herein by one of ordinary skill in the art without departing from the general spirit and scope of the invention as defined by the following claims and the equivalents thereof.

We claim:

1. A beverage dispensing system, comprising:
a nozzle;
a water source in communication with the nozzle;
an ingredient source in communication with the nozzle; and
a syringe cartridge assembly in communication with the nozzle;
the syringe cartridge assembly comprising an ingredient chamber with an ingredient therein, a water chamber with water therein, and a plunger therebetween;
wherein the ingredient chamber is in communication with the nozzle and the water chamber is in communication with the water source such that a dose of water from the water source to the water chamber moves the plunger to force a dose of the ingredient to the nozzle.

2. The beverage dispensing system of claim 1, wherein the syringe cartridge assembly comprising a dosing pump in communication with the water source.

3. The beverage dispensing system of claim 2, wherein the dosing pump comprises a positive displacement pump.

4. The beverage dispensing system of claim 2, wherein the water chamber is in communication with the dosing pump via a dosing conduit.

5. The beverage dispensing system of claim 1, wherein the ingredient source comprises a micro-ingredient source.

6. The beverage dispensing system of claim 5, wherein the micro-ingredient source comprises a volume of micro-ingredients therein with a reconstitution ratio of about ten to one and higher.

7. The beverage dispensing system of claim 1, wherein the ingredient source comprises a macro-ingredient source.

8. The beverage dispensing system of claim 7, wherein the macro-ingredient source comprises a bag-in-box.

9. The beverage dispensing system of claim 1, wherein the ingredient chamber is in communication with the nozzle via a needle.

10. The beverage dispensing system of claim 9, wherein the needle comprises a metal.

11. The beverage dispensing system of claim 9, wherein the needle comprises a disposable needle.

12. The beverage dispensing system of claim 1, wherein the syringe cartridge assembly comprises a locking interface positioned about the nozzle.

13. The beverage dispensing system of claim 1, wherein a volume of the dose of water from the water source equals a volume of the dose of the ingredient from the ingredient chamber.

14. The beverage dispensing system of claim 1, wherein the syringe cartridge assembly comprises a cartridge body made of a food grade thermoplastic.

15. The beverage dispensing system of claim 1, further comprising a plurality of syringe cartridge assemblies in communication with the nozzle.

* * * * *